United States Patent [19]
Hodozuka et al.

[11] Patent Number: 5,476,210
[45] Date of Patent: Dec. 19, 1995

[54] STRUCTURE FOR JOINING PLATE ELEMENTS AND METHOD FOR JOINING THE SAME

[75] Inventors: Yasuo Hodozuka, Oura; Tadashi Iida, Menuma; Yoshikazu Yamaga, Ojima; Satoshi Ueda; Yasuo Imaizumi, both of Oota, all of Japan

[73] Assignee: Fuji Jukogyo Kabushiki Kaisha, Tokyo, Japan

[21] Appl. No.: 264,356

[22] Filed: Jun. 22, 1994

[30] Foreign Application Priority Data

Jun. 25, 1993 [JP] Japan .................................. 5-155648
Jun. 25, 1993 [JP] Japan .................................. 5-155649

[51] Int. Cl.⁶ .............................. B23K 9/02; B23K 9/04
[52] U.S. Cl. ....................... 228/165; 228/173.6; 228/125
[58] Field of Search .................................. 228/136, 153, 228/165, 166, 173.6, 173.7

[56] References Cited

U.S. PATENT DOCUMENTS

| | | | |
|---|---|---|---|
| 2,758,367 | 8/1956 | Dougherty | 228/173.6 |
| 2,889,619 | 6/1959 | Robinson | 228/173.6 |
| 4,618,181 | 10/1986 | Tokuda et al. | 228/173.6 |

FOREIGN PATENT DOCUMENTS

| | | | |
|---|---|---|---|
| 48532 | 4/1977 | Japan | 228/173.6 |
| 63-56366 | 3/1988 | Japan . | |
| 667029 | 2/1952 | United Kingdom . | |
| 868628 | 5/1961 | United Kingdom . | |

*Primary Examiner*—Samuel M. Heinrich
*Attorney, Agent, or Firm*—Beveridge, DeGrandi, Weilacher & Young

[57] ABSTRACT

In order to join a first plate element such as a rear quarter panel of an automobile and a second plate element such as a roof panel together, an edge portion of the first plate element is provided with a joggled portion. The joggled portion is formed integrally with a general portion of the first plate element by way of a shoulder. The joggled portion includes an offset reinforcing portion having a band-shaped recess along the shoulder. A major portion lying closer to the terminal edge of the joggled portion than the reinforcing portion includes a joining surface to which an edge portion of the second plate element is joined in a face-to-face contact in such a manner that a gap is defined between an terminal edge of the edge portion and the shoulder. A welding material is built up into the recess of the reinforcing portion through the gap to thereby join the first and second plate elements together. The welding material within the recess reaches the back side of the second plate element so that the welding area is increased by the welding material and that the rigidity and strength of the joined structure is increased due to the cooperation of the reinforcing portion and the welding material. The structure prevents a local heating, suppresses thermal strains and concave thermal deformation of the two plate elements after cooling, and hence omits the hammering after the welding.

8 Claims, 7 Drawing Sheets

STRUCTURE FOR JOINING PLATE ELEMENTS AND METHOD FOR JOINING THE SAME

BACKGROUND OF THE INVENTION

The present invention relates to a structure for joining plate elements and a method for joining the same and, particularly, to a plate joining structure obtained by superposing an edge portion of one plate element on a joggled portion of another plate element and by welding a gap defined by the joggled portion and a terminal edge of the one plate element, and to a method for joining the plate elements.

In a known structure for joining plate elements of the above type, as disclosed in Japanese Patent Laid-open Pub. No. 63-56,366, a first plate element to be coupled with a second plate element is provided along its edge with a joggled portion formed contiguously to, and in an offset relation to a general portion of the first plate element in such a manner that the joggled portion will form a joining surface offset from the general portion and also form a shoulder between the general portion and the joggled portion, while the second plate element has an edge portion secured to the joining surface in a face-to-face contact therewith. A padding of weld fixedly secures the joggled portion and the edge portion together.

In the above structure for joining plate elements, the two plate elements can be welded and joined together without leaving on the surface of the plate elements any recess or impression that is caused by a spot welding electrode at the time of tack welding, since a movable electrode is brought into contact with and is pressed against an edge portion of one plate element for the spot welding and thereafter a deposition of a padding weld is executed into the space defined between two plate elements.

As will be described in detail later, however, local heating by the padding of weld results in generation of large thermal strains in the plate elements and cause concave thermal deformation after cooling. This requires such a finishing work as repeated steps of hammering the back side of the joined structure and/or grinding the front side. This finishing work requires skill of the worker and largely depends on the technique of the individual worker, causing deterioration in the quality of finishing and reduction in panel thickness of the joined structure. Furthermore, due to the necessity of repeated operation and large amount of the weld material remaining on the exterior of the surface of the joined structure, the number of the finishing work steps increases and deterioration in the working environment may be induced. Moreover, the welded structure is not sufficiently rigid and strong.

SUMMARY OF THE INVENTION

It is an object of the present invention to provide a structure for joining plate elements and a method for joining the same, that are capable of suppressing thermal strains and concave thermal deformation which are caused by padding weld, thereby reducing the finishing work and improving the working environment as well as obtaining a joined structure of high strength, rigidity and quality.

According to a first aspect of the present invention, there is provided a plate joining structure for joining a first plate element and a second plate element, the structure comprising a joggled portion formed contiguously to a general portion of the first plate element, the joggled portion forming a joining surface and also forming a shoulder between the general portion and the joggled portion; an edge portion of the second plate element secured to the joining surface in a face-to-face contact therewith; and a weld fixedly securing the joggled portion and the edge portion to each other: the joining structure being characterized in that the joggled portion comprises a major portion defining the joining surface and bearing the edge portion and a band-shaped offset reinforcing portion extending along the shoulder and displaced from the major portion in a direction perpendicular to a plane of the joggled portion.

According to a second aspect of the present invention, there is provided a method for joining a first plate element and a second plate element, comprising providing the first plate element with a joggled portion contiguously to a general portion of the first plate element, the joggled portion forming a joining surface offset from the general portion and also forming a shoulder between the general portion and the joggled portion; securing an edge portion of the second plate element to the joining surface in a face-to-face contact; and welding the joggled portion and the edge portion together: the method being characterized by comprising the steps of providing the joggled portion with a major portion defining the joining surface and with a band-shaped offset reinforcing portion extending along the shoulder and displaced from the major portion in a direction perpendicular to a plane of the joggled portion; placing the edge portion of the second plate element onto the joining surface with a gap formed along a free edge of the edge portion; and filling and depositing a welding material into the gap to fixedly secure the joggled portion and the edge portion without deformation.

Preferred embodiments of the present invention will be understood from the following detailed description referring to the accompanying drawings.

DESCRIPTION OF THE PREFERRED EMBODIMENTS

Previous to the description of embodiments in accordance with the present invention, prior art will briefly be described with reference to FIGS. 11 to 13 in order to clarify advantages of the present invention over the prior art.

Figure 11:
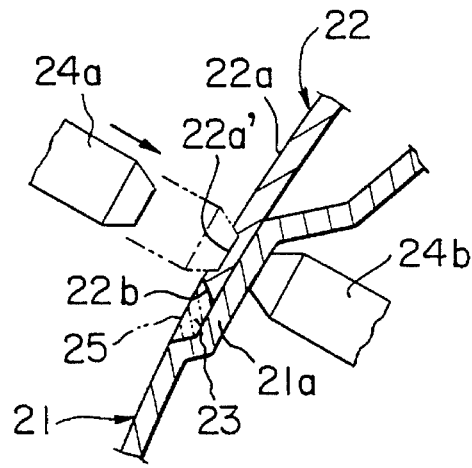
FIG. 11 is a sectional view showing a conventional method for joining plate elements.
Figure 12:
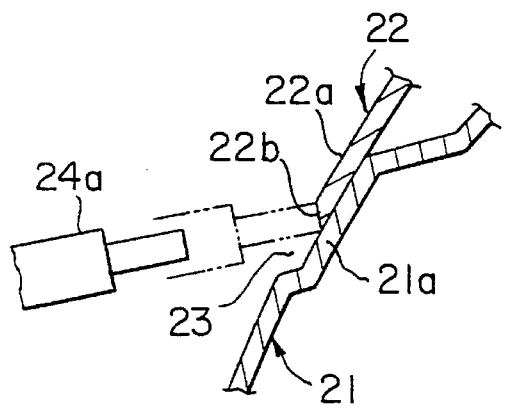
FIGS. 12 and 13 are sectional views showing different steps in the conventional method for joining the plate

A conventional method for joining plate elements used in automobile manufacturing comprises the steps, as shown in FIG. 11, of joggling a rear quarter panel (first plate element) 21 as designated at 21a, superposing an edge portion 22a of a roof panel (second plate element) 22 on the outer surface of the joggled portion 21a so as to define a recessed space 23 between a shoulder of the joggled portion 21a and an edge 22b of the roof panel 22, causing a movable electrode 24a to press the roof panel 22 in the vicinity of the space 23 against the rear quarter panel 21 in cooperation with a stationary electrode 24b to thereby perform a spot welding, and thereafter executing a padding weld to produce a padding as indicated by a chain double-dashed line 25. According to such a joining method, however, a circular recessed impression 22a' remains on the surface of the roof panel 22 since the roof panel 22 is forcibly pressed against the rear quarter panel 21 by the movable electrode 24a for the spot welding. To improve the appearance, the impression must be removed after the completion of the spot welding. This requires additional operation of placing a filler into the impression 22a'.

A method for joining two plate elements without leaving any impression due to the spot welding has been proposed in Japanese Patent Laid-open Pub. No. 63-56,366. The joining method comprises the steps, as shown in FIG. 12, of joggling a rear quarter panel 21 as indicated at 21a, superposing an edge portion 22a of a roof panel 22 onto a joggled portion 21a so as to define a recessed gap between the rear quarter panel 21 and a beveled edge 22b of the roof panel 22, and causing a movable electrode 24a to abut against the bevel edge 22b for indirect spot welding.

Figure 13:
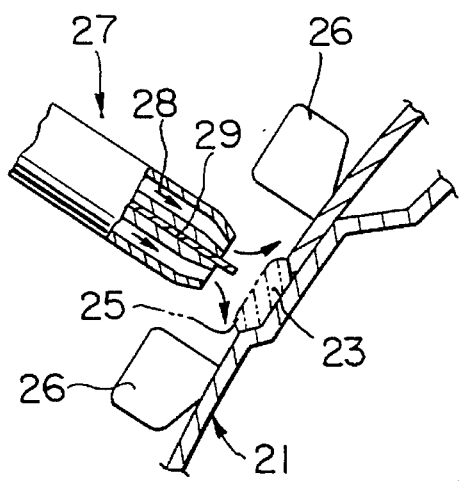

Thereafter a padding weld as indicated by the chain double-dashed line 25 in FIG. 13 is effected to fill the gap 23 between the two plate elements. The padding weld may be carried out by a MIG welding method in which a cooling metal fixture 26 is disposed in the vicinity of the gap 23, and in which an inert gas 28 is blown onto the portion being welded through a gas nozzle 27 surrounding a metal electrode 29 which is a filler metal, thereby effecting a welding in a manner to prevent an adverse influence by oxygen or nitrogen in the air. At the completion of the padding of weld, a finishing work is performed by use of a grinder to smoothen the weld surface.

According to the joining method described above, two plate elements are welded and joined together without leaving any impression which would otherwise arise from the spot welding, since the movable electrode is brought into contact with and pressed against the beveled edge of the second plate element for spot welding before a padding of weld is formed in the space between the two plate elements.

However, presence of burrs and shear drops on the edge of the second plate element would disadvantageously lead to poor joining properties between the two plate elements since the first plate element is joggled and the edge portion of the second plate element is superposed on the joggled portion. Further, the gap between the two plate elements is defined by the shoulder of the joggled portion and the edge of the second plate element, and the padding of weld is executed into this space. For this reason, the welded area is narrow so that it is difficult to have a sufficient weld strength. Furthermore, a local heating by the padding of weld will result in a large thermal strain of the plate elements and cause a deformation of the joining structure into concave shape after cooling. This may require measures to perform a finishing work comprising repeated steps of hammering the internal side of the plate element and grinding the external side by means of a grinding wheel. This finishing work needs a skill of the worker and largely depends on the technique of the individual worker, with resultant possible deterioration in the quality of finishing and a reduction in the thickness of the joined plate elements. Inconveniently, due to the necessity of repeated operations and larger amount of the weld material remaining on the exterior of the surface of the joined plate elements, the number of the finish work steps is increased and a deterioration in the working environment cannot be avoided.

Description will now be given of embodiments of the present invention which can solve the above problems, by taking examples of joining a rear quarter panel. and a roof panel together in the automobile manufacturing process.

Figure 1:
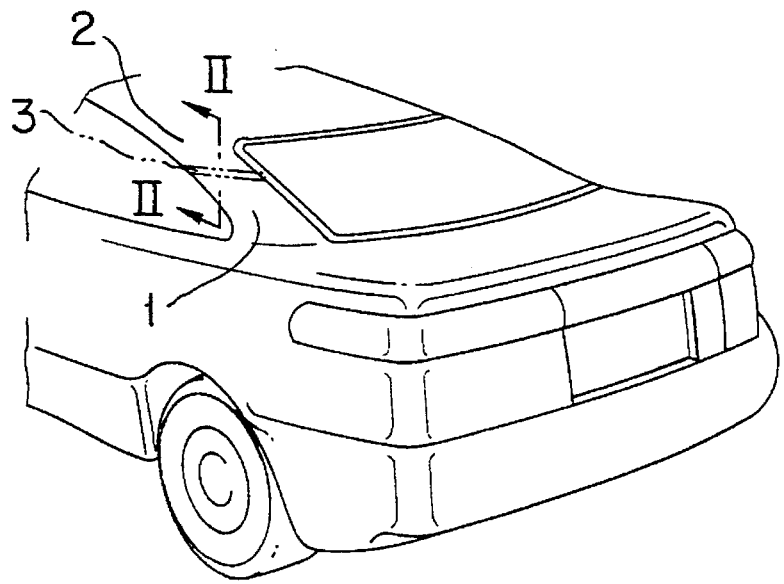
FIG. 1 is a perspective view showing the rear of an automobile body incorporating the structure for joining plate elements in accordance with the present invention.

FIG. 1 is a perspective view showing the rear of an automobile body. Reference numeral 1 denotes a rear quarter panel which is a first plate element, and 2 designates a roof panel which is a second plate element.

Figure 2:
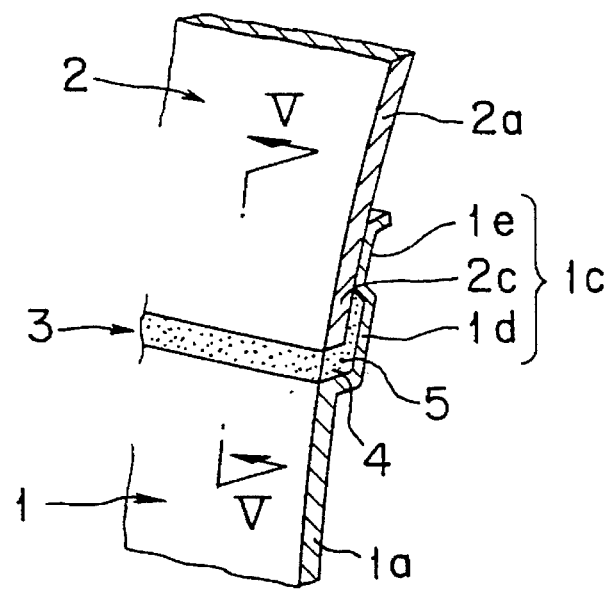
FIG. 2 is a sectional view taken along a plane II—II of FIG. 1.

FIG. 2 shows a section taken along the plane II—II of FIG. 1. The rear quarter panel 1 consists of a general portion 1a and an edge portion 1c used for joining to the roof panel 2. The edge portion 1c is a joggled portion that is formed contiguously to, and in an offset relation to the general portion 1a. The roof panel 2 also consists of a general portion 2a and an edge portion 2c which is joined to the joggled portion 1c in a superposed relation thereto. The joggled portion 1c and the edge portion 2c are joined together through a padding 5 of weld as will be described below in more detail.

Figure 3:
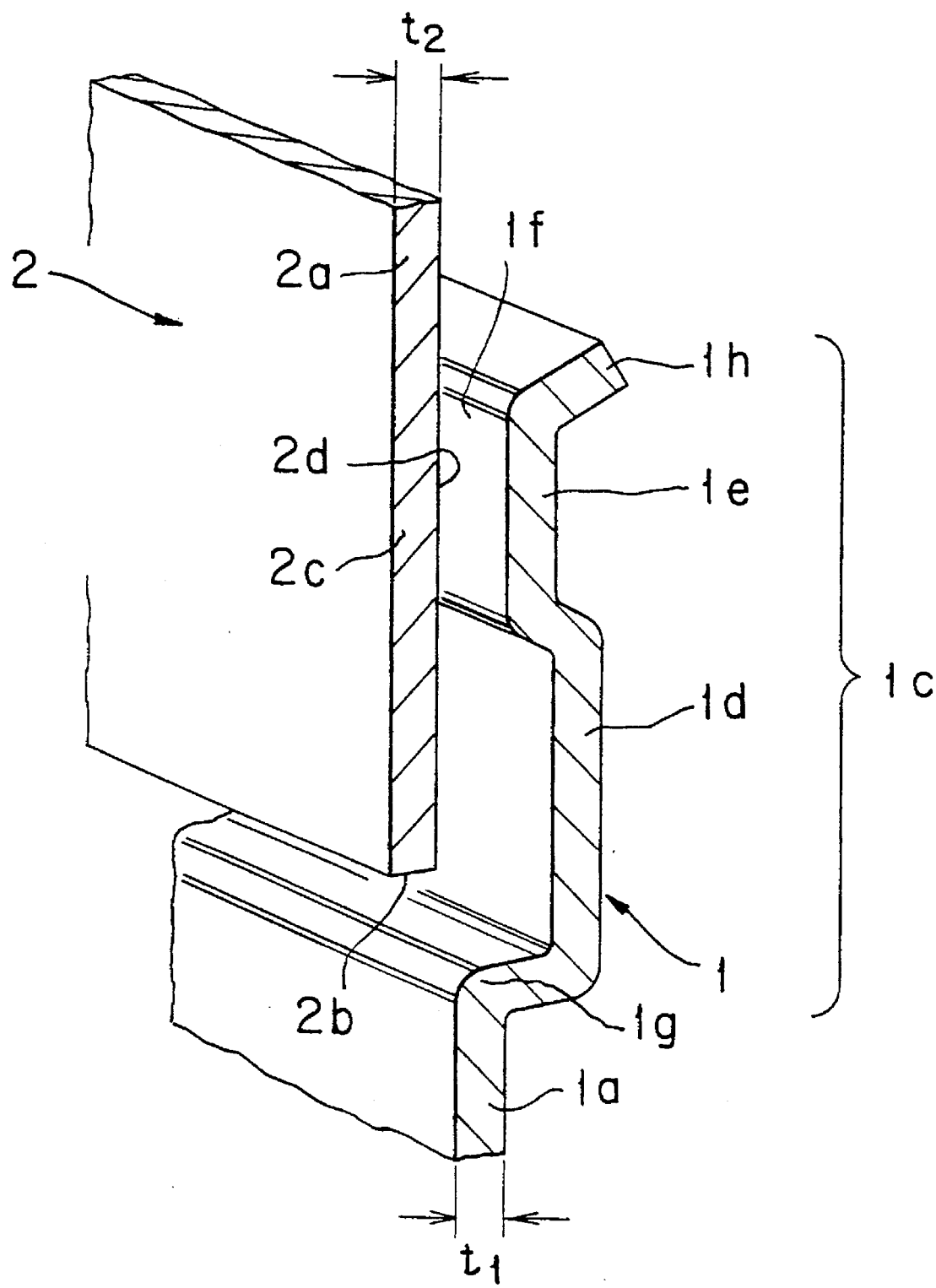
FIG. 3 is an exploded perspective view of two plate elements to be joined.
Figure 4:
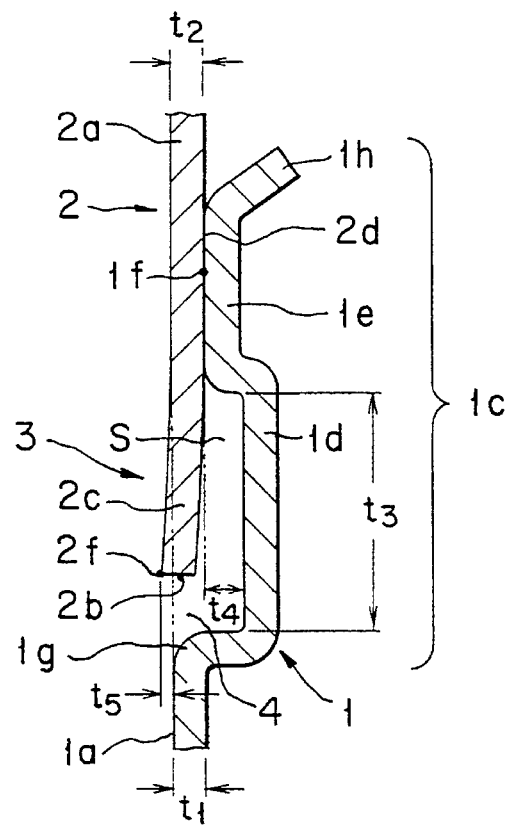
FIG. 4 is a sectional view showing a method for joining the two plate elements in accordance with the present invention.

As indicated in FIGS. 3 and 4, the joggled portion 1c is generally offset from the general portion 1a and comprises a major portion 1e having a joining surface 1f thereon, and a band-shaped offset reinforcing portion 1d displaced from the major portion 1e in a direction perpendicular to the plane of the major portion 1e. A shoulder 1g is formed between the general portion 1a and the joggled portion 1d, and hence between the general portion 1a and the reinforcing portion 1d. The reinforcing portion 1d therefore extends along the shoulder 1g. The terminal edge 1h of the major portion 1e may extend obliquely away from the roof panel 2 as shown.

The roof panel 2 has a joining surface 2d that is to be joined to the joining surface 1f of the quarter panel 1. The edge portion 2c of the roof panel 2 terminates short of the shoulder 1g and therefore a gap 4 is defined between the shoulder 1g and the free edge 2b of the panel 2, as shown in FIG. 4, when the two panels 1 and 2 are joined together. The edge portion 2c may extend obliquely in a manner to be more remote from the reinforcing portion 1d as it extends toward its edge 2b.

Figure 5:
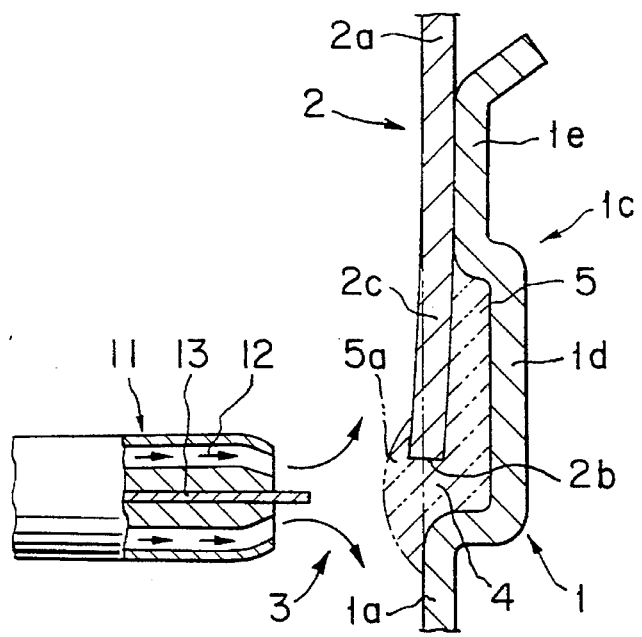
FIG. 5 is a sectional view taken along a line V—V of FIG. 2.

The band-shaped reinforcing portion 1d is, in this embodiment, in the form of a band-shaped recess opening toward the edge portion 2c of the roof panel 2. A space S is therefore defined in the reinforcing portion 1d, which space is partly closed by the edge portion 2c. A welding metal 5 is filled in the space S and the gap 4 as shown in FIG. 5 to join the two panels 1 and 2 together.

A method for joining the rear quarter panel 1 and roof panel 2 together will be described with reference to FIGS. 4 and 5.

The thickness $t_1$ of the rear quarter panel 1 and the thickness $t_2$ of the roof panel 2 used in this embodiment are of the order of 0.75 mm. The recess width $t_3$ of the reinforcing portion 1d formed in the joggled portion 1c is about 4.0 mm, and the depth $t_4$ from the joining surface 1f to the bottom of the reinforcing portion 1d is approximately 0.5 mm.

The joining surface 2d of the roof panel 2 is superposed on the joining surface 1f of the joggled portion 1c of the rear quarter panel 1 in such a manner that the width of the gap 4 is about 1.0 mm and that the amount $t_5$ by which an outer corner 2f on the edge 2b protrudes from the surface of the general portion 1a of the rear quarter panel 1 is about 0.1 mm. The relative positions between the rear quarter panel 1 and the roof panel 2 are retained by a welding jig not shown. With the rear quarter panel 1 and the roof panel 2 having the thus established relative positions, the major portion 1e of the rear quarter panel 1 is placed in a face-to-face contact with the joining surface 2d remote from the edge 2b of the roof panel 2, so that the edge 2b tending to generate burrs and/or shear drops is prevented from being brought into contact with the rear quarter panel 1. As a result, good joining properties are obtained irrespective of occurrence of burrs and/or shear drops on the edge 2b of the roof panel 2.

Then, the superposed portions of the rear quarter panel 1 and the roof panel 2 which have been held by the welding jig are joined to each other with a padding of weld by means of a braze arc welding.

The padding of weld is deposited as shown in FIG. 5, under the condition where the relative positions between the rear quarter panel 1 and the roof panel 2 are retained, by means of the braze arc weld in which an inert gas 12 is blown through a gas nozzle 11 toward the gap 4 to form a weld portion 3. The gas nozzle 11 surrounds a metal electrode 13 which is a filler metal.

A molten welding metal 5 is filled into the gap 4 between the plate elements and further into the interior space S of the reinforcing portion 1d so as to join together the edge portions 1c and 2c, respectively, of the rear quarter panel 1 and the roof panel 2.

During the process of welding, the molten metal 5 reaches not only the gap 4 between the plate elements but also the interior spaces of the reinforcing portion 1d so that the region of the molten metal will extend even to the rear side of the edge portion 2c of the roof panel 2 and to the bottom of the reinforcing portion 1d. As a consequence, the welding region is remarkably increased with an increased radiating effect and a local heating is avoided, as compared with the conventional welding in which the region of reach of the molten metal is limited to the gap 4 between the plate elements. It will be understood that this prevents thermal strains of the rear quarter panel 1 and the roof panel 2 and the concave thermal deformation of the joined structure, with a result of less deformations of the rear quarter panel 1 and the roof panel 1 and an increased strength of the welding portion 3.

The welding is followed by a finishing work for smoothening the surface of the welding portion 3. The number of steps for the finishing work can be greatly reduced with omission of the hammering on the back side of the joined structure since the thermal strains and concave thermal deformation that may occur in the structure are suppressed. Thus, the finishing work may comprise only grinding operation on the exterior side by means of a grinder.

The grinding operation for obtaining a smoothed surface mainly comprises the steps of grinding the deposited metal 5a (FIG. 5) in the region of the gap 4, protruding from the rear quarter panel 1 and roof panel 2, and grinding the corner portion 2f of the roof panel 2 previously formed so as to project from the general portion 1a of the rear quarter panel 1. There is no necessity of conventional grinding over a wide region affected by the welding strains. Thus, the invention enables a significant curtailment in grinding operation and prevention of the deterioration of the working environment due to grinding particles, as well as prevention of the reduction in the rigidity and strength of the structure due to a substantial reduction in the total thickness of the rear quarter panel 1 and the roof panel 2 which will be caused by the grinding for obtaining a smooth surface.

Figure 6:
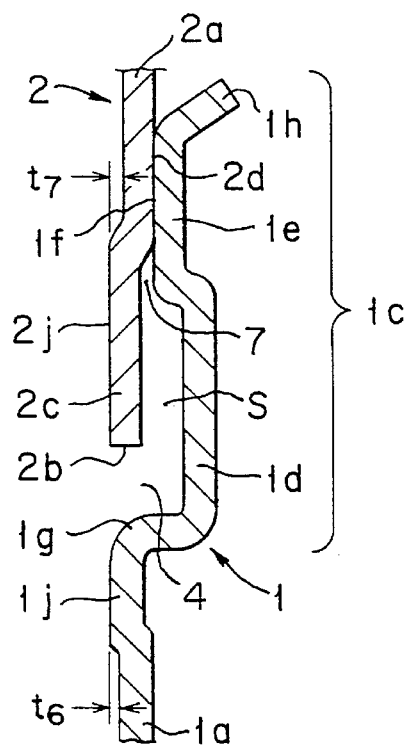
FIG. 6 is a sectional view showing a relationship of the two plate elements in another embodiment of the present invention.
Figure 7:
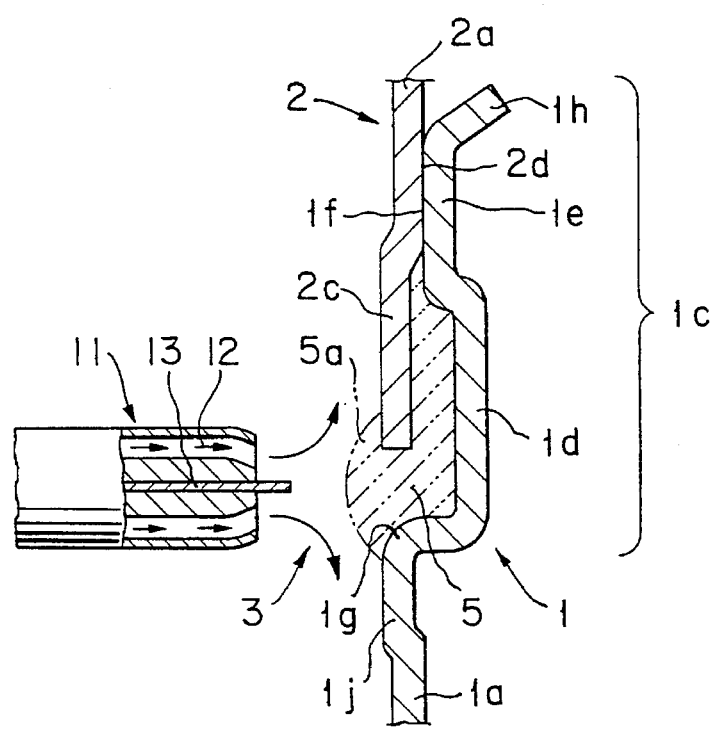
FIG. 7 is a sectional view similar to FIG. 5, but showing how the two plate elements are joined in the other embodiment of the invention.

Another embodiment of the present invention will be described with reference to FIGS. 6 and 7 corresponding to FIGS. 4 and 5, respectively. Portions corresponding to those in FIGS. 4 and 5 are designated by the same reference numerals to thereby omit a detail description thereof. As shown in FIG. 6, a general portion 1a adjacent to a joggled portion 1c of the rear quarter panel 1 is provided with a protruding portion 1j projecting by an amount $t_6$ of about 0.1 to 0.2 mm from the general portion 1a along the shoulder 1g of the plate element. On the other hand, the roof panel 2 is provided with a protruding portion 2j that extends between the edge 2b of the edge portion 2a and the part of the panel 2 abutting against the major portion 1e of the joggled portion 1c. The portion 2j projects by an amount $t_7$ of about 0.1 to 0.2 mm and provides a small gap 7 between the joining surface 1f and the panel 2.

The thus configured rear quarter panel 1 and roof panel 2 are fastened by a welding jig, and a welding is effected in the gap between the plate elements. A molten metal 5 is filled into the gap 4 defined between the plate elements and further into the interior space S of the reinforcing portion 1d. The metal 5 reaches the joggled portion 1c of the rear quarter panel 1 and the back side of the edge portion 2c of the roof panel 2 to weld and join the two elements together.

During the process of welding, in the same manner as the previous embodiment, the molten metal 5 fills the gap 4 and the interior space S of the reinforcing portion 1d, and even the small gap 7 to thereby increase the welding area. With the improved rigidity due to the increased weld area and the provision of the protruding portions 1j and 2j and the small gap 7, the strength of the welding portion 3 is increased, and a local heating is prevented to suppress the thermal strains and concave thermal deformation of the structure.

The number of steps of the finishing work subsequent to the welding can therefore be greatly reduced with the omission of hammering operation on the internal side of the joined structure.

The grinding operation for obtaining a smooth surface mainly comprises the steps of grinding the deposited metal 5a projecting on the rear quarter panel 1 and roof panel 2 by means of a grinder, and grinding the protruding portions 1j and 2j both serving as finishing stock for smoothening the welded portion. As a result, a significant reduction in the area to be ground is realized as compared with the conventional area to be ground. Furthermore, the reduction in the amount to be ground of the rear quarter panel 1 and the roof panel 2 ensures sufficient panel thickness to be retained and prevents reduction in rigidity and strength.

According to the embodiments described above, the major portion 1e of the rear quarter panel 1 is superposed on the joining surface 2d remote from the edge 2b of the roof panel 2, whereby the edge 2b tending to have burrs and/or shear drops is prevented from contact with the rear quarter panel 1 to consequently provide good joining properties between the two elements to ensure a good assembling accuracy. Moreover, during the process of welding, the molten metal 5 is filled into not only the gap 4 between the plate elements but also the interior space S of the reinforcing portion 1d, with resultant increase of the weld area between the rear quarter panel 1 and the roof panel 2 and hence of the radiating area to improve the radiating effect so as to prevent local heating. This suppresses occurrence of the thermal strains in the rear quarter panel 1 and roof panel 2 and the concave thermal deformation. The increased welding area also leads to increased strength of the welding portion.

The improvement in the joining properties and the suppression of the deformation of the panes 1 and 2 caused by the welding enables the hammering operation on the back side of the joined structure to be omitted or greatly curtailed to such a degree that only a grinding operation is needed. The grinding work for obtaining a smooth surface may mainly comprise the step of grinding the deposited metal 5a protruding on the rear quarter panel 1 and the roof panel 2 which reduces the area to be ground, to consequently greatly simplify the finishing work, improve the working environment, and prevent reduction in rigidity and strength due to the reduction in the thickness of the joined structure, accompanied by a good quality of the structure.

Figure 8:
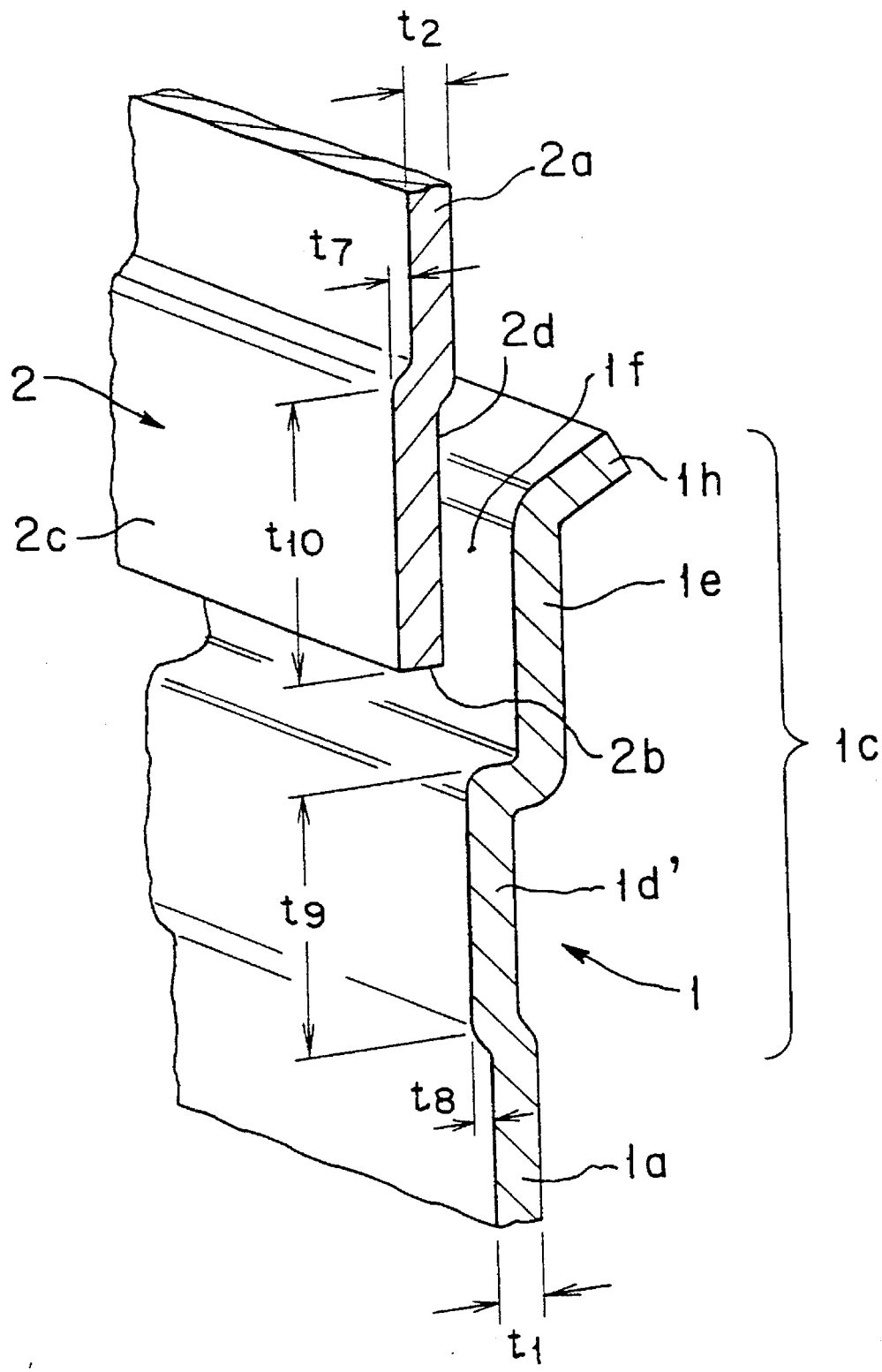
FIG. 8 is an exploded perspective view of the two plate elements for use in a further embodiment of the present invention.
Figure 9:
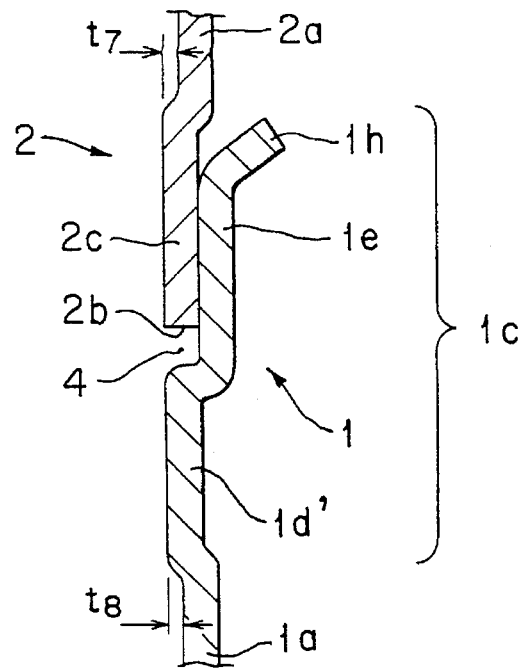
FIG. 9 is a sectional view showing the plate elements of FIG. 8 in a coupled condition.
Figure 10:
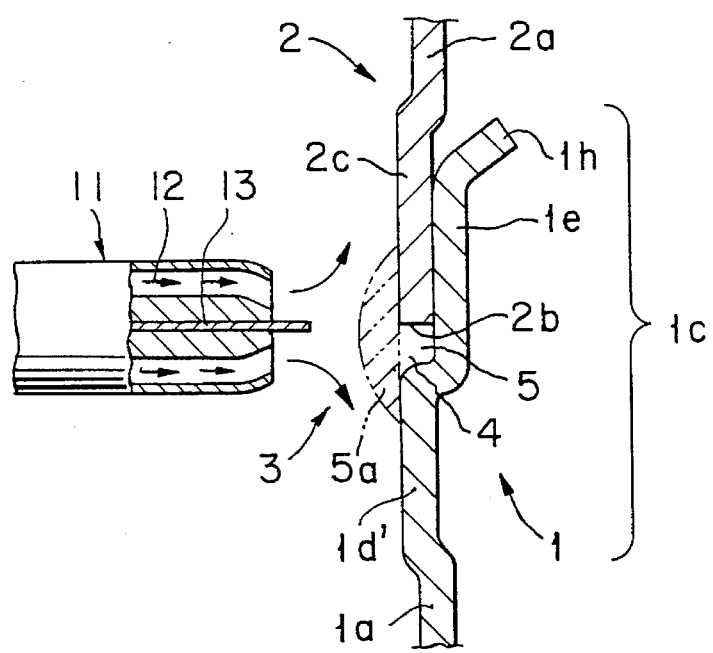
FIG. 10 is a sectional view showing the method for joining the plate elements of FIG. 9.

FIGS. 8 to 10 show a still further embodiment of the present invention. This embodiment differs from the embodiment shown in FIGS. 6 and 7 in that the band-shaped offset reinforcing portion 1d'is not of a concave shape (FIGS. 6 and 7) having a recess opening toward the roof panel 2, but of a convex shape displaced toward the roof panel 2. A general portion 1a of the rear quarter panel 1 is offset from the surface of the reinforcing portion 1d'by a distance $t_8$. The portions in this embodiment equivalent to those in the embodiment in FIGS. 6 and 7 are designated by the same reference numerals, of which description will be omitted.

The thickness $t_1$ of the rear quarter panel 1 and the thickness $t_2$ of the roof panel 2 for use in this embodiment are of the order of 0.75 mm. The reinforcing portion 1d'of the rear quarter panel 1 has a width $t_9$ of about 3.0 mm and projects from the surface of the general portion 1a by an amount $t_8$ of about 0.1 to 0.2 mm. An edge portion 2c of the roof panel 2 has a width $t_{10}$ of the order of 3.0 mm and projects from the surface of a general portion 2a by an amount $t_7$ of about 0.1 to 0.2 mm. As is clear from the sectional view of FIG. 9, when the edge portion 2c of the roof panel 2 is superposed on the major portion 1e of the rear quarter panel 1, the general portion 1a of the rear quarter panel 1 and the general portion 2a of the roof panel 2 lie in substantially the same plane.

After the establishment of the relative positions of the two panels, a welding jig not shown is used to retain the relative positions of the two panels.

Then, a welding operation by a braze arc welding is effected into a gap 4 defined by the rear quarter panel 1 and the roof panel 2 thus retained by the weld jig, to thereby weld and join the two panels together.

This welding is carried out by means of the braze arc welding in which an inert gas 12 is blown through a gas nozzle 11 toward the gap 4 to form a welding portion 3. The nozzle 11 surrounds a metal electrode 13 which is a filler metal.

A molten metal 5 infiltrates into a minute gap between the major portion 1e of the rear quarter panel 1 and the opposing surface of the edge portion 2c of the roof panel 2, to thereby join the two panels together. The rigidity of the joined structure is increased and thermal strains and concave thermal deformation are suppressed due to the provision of the reinforcing portion 1d'adjacent to the gap between the plate elements and projecting from the general portion 1a as well as the provision of the joggled edge portion 2c projecting from the general portion 2a.

The welding is followed by a finishing work for smoothening the surface of the welding portion 3. In the finishing work, hammering operation on the back side of the joined structure can be omitted or greatly curtailed by merely performing a grinding operation on the exterior side by means of a grinder.

A smooth surface contiguous to the general portions 1a and 2a of the rear quarter panel 1 and the roof panel 2, respectively, can be obtained through a grinding operation mainly including a grinding of the deposited metal 5a (FIG. 10) protruding on the rear quarter panel 1 and the roof panel 2 and a grinding of the protruding reinforcing portion 1d'of the rear quarter panel 1 and of the joggled edge portion 2c of the roof panel 2 which serve as finishing stock for smoothening the welding portion. The area to be ground can be greatly reduced as compared with the conventional area to be ground, which results in significant simplification of the finishing work and prevention of the deterioration in the working environment due to the grinding particles and so on. Furthermore, the reduction in the amount to be ground of the rear quarter panel 1 and the roof panel 2 ensures a sufficient panel thickness to be retained and prevents the rigidity and strength from being reduced, thus providing a joined structure of high quality.

Although the above description has been made in the case of joining the rear quarter panel and the roof panel together, the present invention is widely applicable to other joined structures between plate elements of the automobile body in which the two plate elements such as a rear quarter panel and a rear skirt are joined to each other through a padding weld, as well as joined structures for plate elements in other industrial fields.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method for joining a first plate element and a second plate element, comprising the steps of:

providing said first plate element with a joggled portion contiguously to a general portion of the first plate element, said joggled portion forming a joining surface offset from the general portion and a shoulder between the general portion and the joggled portion;

securing an edge portion of said second plate element to said joining surface in a face-to-face contact; and welding said joggled portion and said edge portion together:

an improvement of said method, which comprises the steps of:

providing said joggled portion with a major portion defining said joining surface and with a band-shaped offset reinforcing portion extending along said shoulder and displaced from said major portion in a direction perpendicular to a plane of the joggled portion;

placing said edge portion of the second plate element onto said joining surface with a gap formed along a free edge of the edge portion; and filling and depositing a welding material into said gap to fixedly secure the joggled portion and the edge portion without deformation.

2. The method according to claim 1, further comprising the steps of:

providing said offset reinforcing portion as a band-shaped recess opening toward said edge portion of the second plate element and disposed between said major portion and said shoulder;

placing said edge portion with said gap formed between said free edge of the edge portion and said shoulder in such a manner that said recess opens to the outside through said gap; and filling and depositing the welding material into said recess through said gap so as to also fill the gap.

3. The method according to claim 2, wherein:

said edge portion is placed so that it is more remote from the recess as the edge portion extends toward the free edge thereof.

4. The method according to claim 2, further comprising the step of:

grinding outer surfaces of the edge portion of the second plate element and the general portion of the first plate element, together with the filled and deposited welding material, to smoothen and level the surfaces.

5. The method according to claim 2, wherein:

said edge portion and a portion of said general portion adjacent said reinforcing portion have raised surfaces; and the raised surfaces are finish-ground together with the filled and deposited welding material.

6. The method according to claim 1, further comprising the steps of:

providing said offset reinforcing portion as a band-shaped protrusion formed on the same side of the joggled portion as said second plate element and disposed between said major portion and said shoulder;

placing said edge portion with said gap formed between said free edge of the edge portion and said protrusion; and filling and depositing the welding material in said gap.

7. The method according to claim 6, further comprising the step of:

grinding outer surfaces of the edge portion and the protrusion, together with the filled and deposited welding material, to smoothen and level the surfaces.

8. The method according to claim 7, wherein:

said edge portion and the protrusion have raised surfaces; and the raised surfaces are finish-ground together with the filled and deposited welding material.

* * * * *